United States Patent [19]

Maruyama

[11] Patent Number: 5,039,211
[45] Date of Patent: Aug. 13, 1991

[54] ZOOM LENS CAPABLE OF IMAGE BLUR COMPENSATION

[75] Inventor: Koichi Maruyama, Tokyo, Japan
[73] Assignee: Asahi Kogaku Kogyo Kabushiki Kaisha, Tokyo, Japan
[21] Appl. No.: 386,227
[22] Filed: Jul. 28, 1989
[30] Foreign Application Priority Data

Jul. 28, 1988 [JP] Japan .................. 63-188647
Jul. 6, 1989 [JP] Japan .................. 1-175298

[51] Int. Cl.⁵ .................. G02B 15/14; G02B 27/64
[52] U.S. Cl. .................. 359/557; 359/686; 359/689
[58] Field of Search .................. 350/423, 500

[56] References Cited

U.S. PATENT DOCUMENTS 4,196,969  4/1980  Itoh .
4,460,251  7/1984  Okudaira .
4,490,017  12/1984  Okudaira et al. .
4,812,026  3/1989  Iima .
4,844,602  7/1989  Kitagishi et al. .......... 350/500
4,871,241  10/1989  Matsuo .
4,907,868  3/1990  Kitagishi et al. .......... 350/500

FOREIGN PATENT DOCUMENTS 62-47011  2/1987  Japan .
62-203119  9/1987  Japan .

OTHER PUBLICATIONS

English Abstract of Japanese Publication No. 62-203119.
English Abstract of Japanese Publication No. 62-47011.

*Primary Examiner*—Bruce Y. Arnold
*Assistant Examiner*—Rebecca D. Gass
*Attorney, Agent, or Firm*—Sandler, Greenblum & Bernstein

[57] ABSTRACT

A zoom lens has three or more lens groups. A variable power lens group or at least one lens group located in a position nearer to an image than a variable power lens group serves as an image blur compensating group which is displaceable with respect the remaining lens groups. The magnification $m_C$ of the image blur compensating group satisfies a relation with respect to a composite focal length $f_1$ of the lens groups nearer to an object than the image blur compensating group such that $$m_C = 1/\{1 + (f_1/A)\}$$

wherein A is an arbitrary constant.

27 Claims, 16 Drawing Sheets

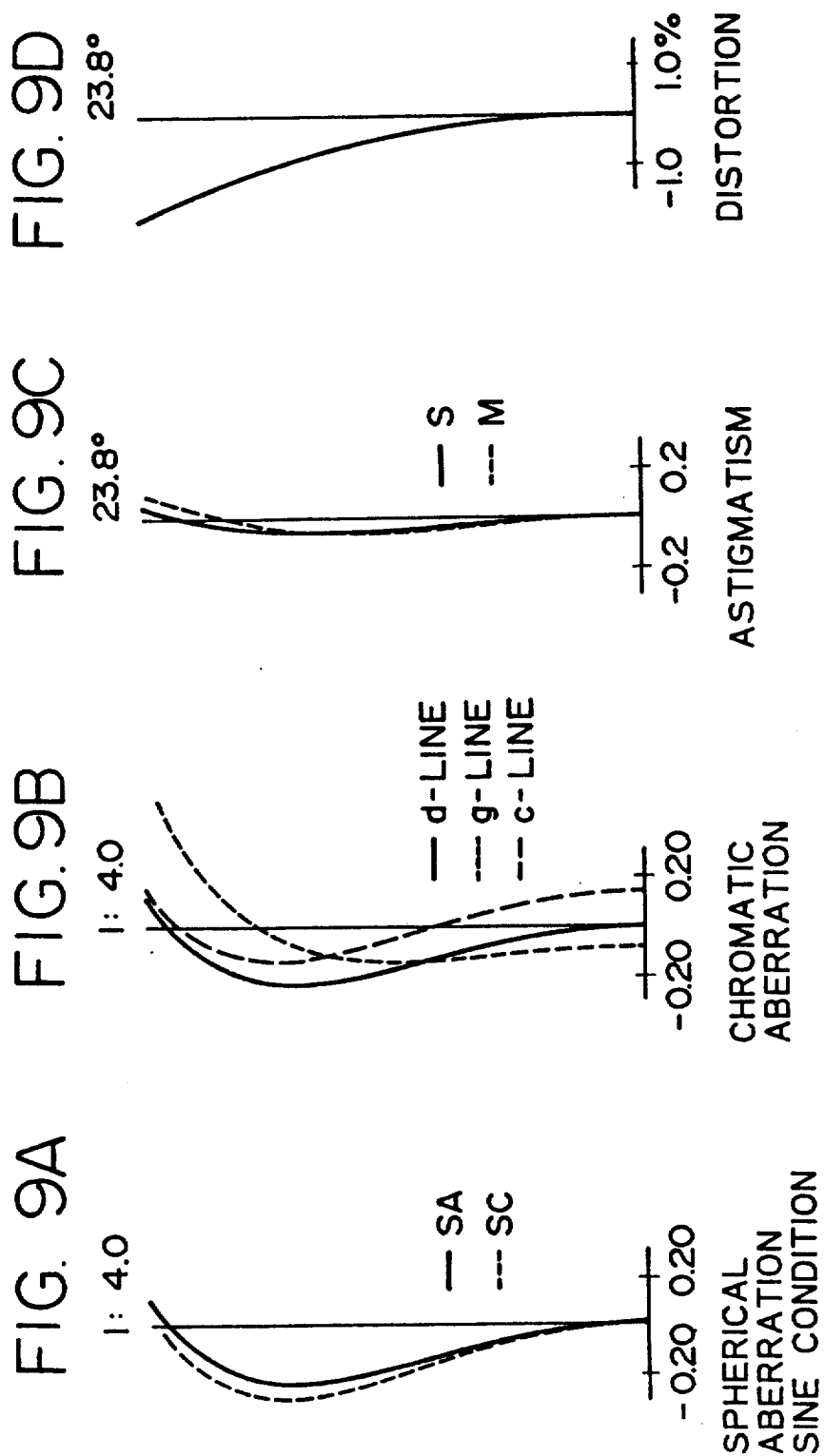

f = 50mm f = 100mm f = 50mm

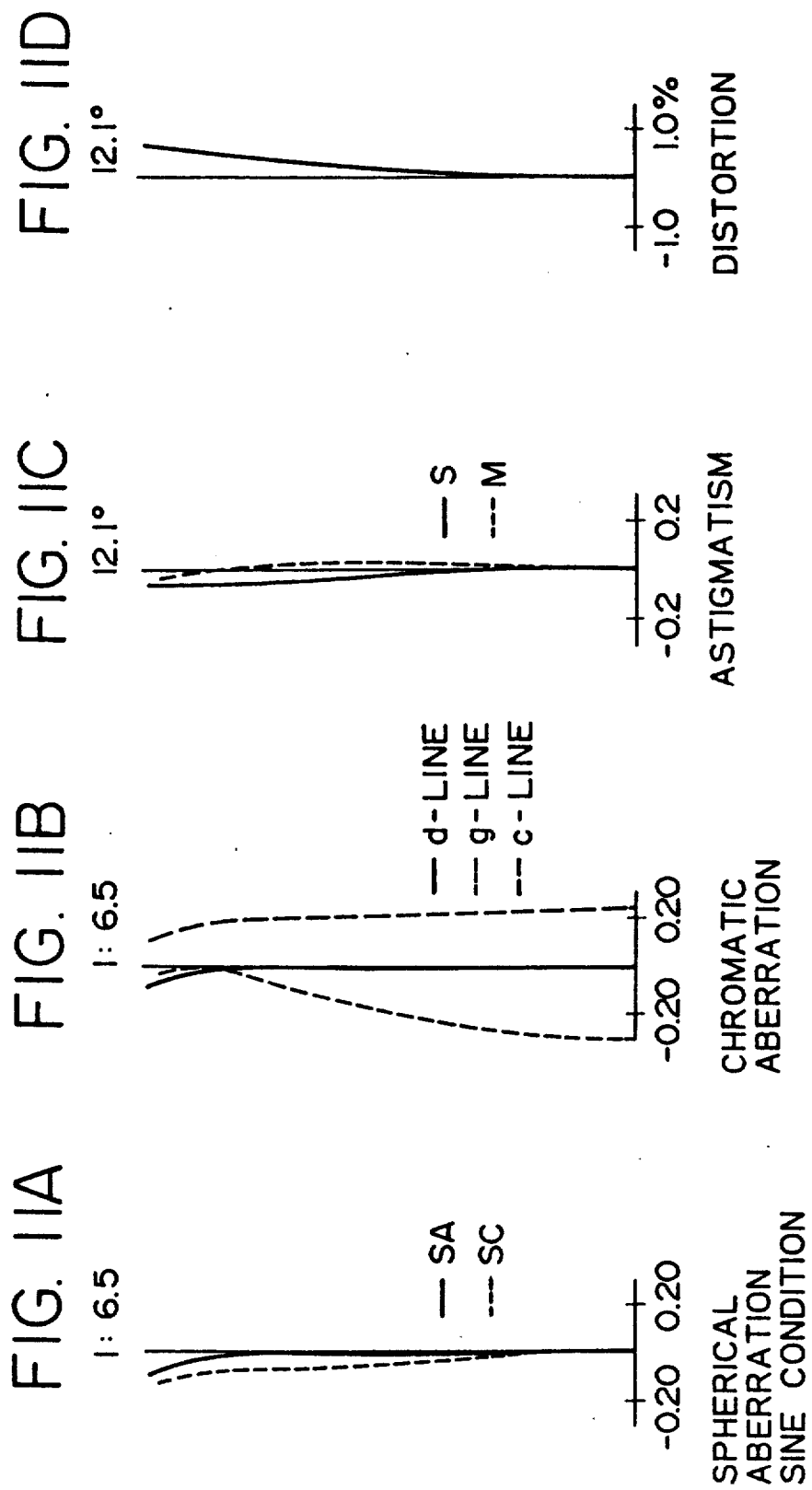

f = 100 mm f = 300 mm

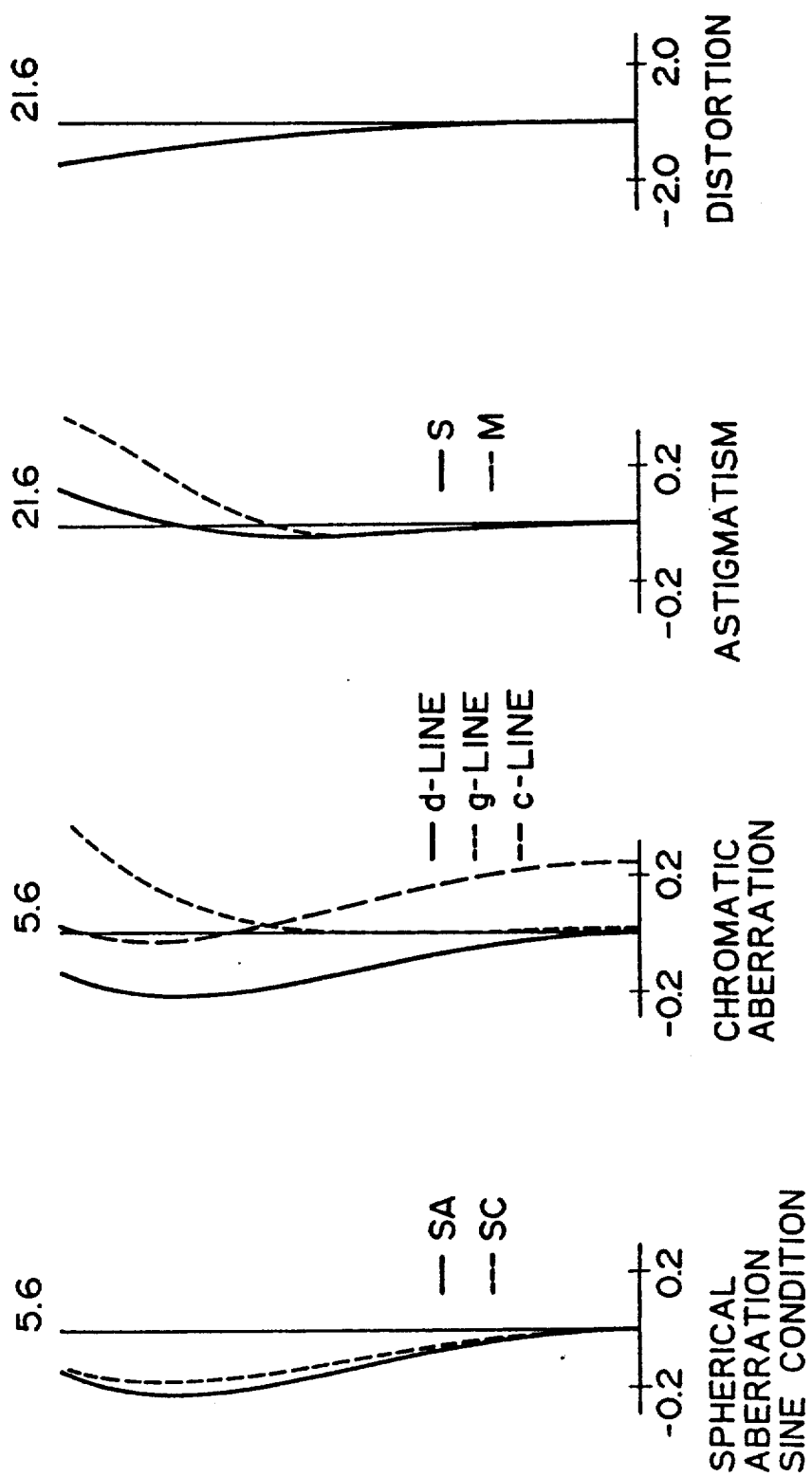

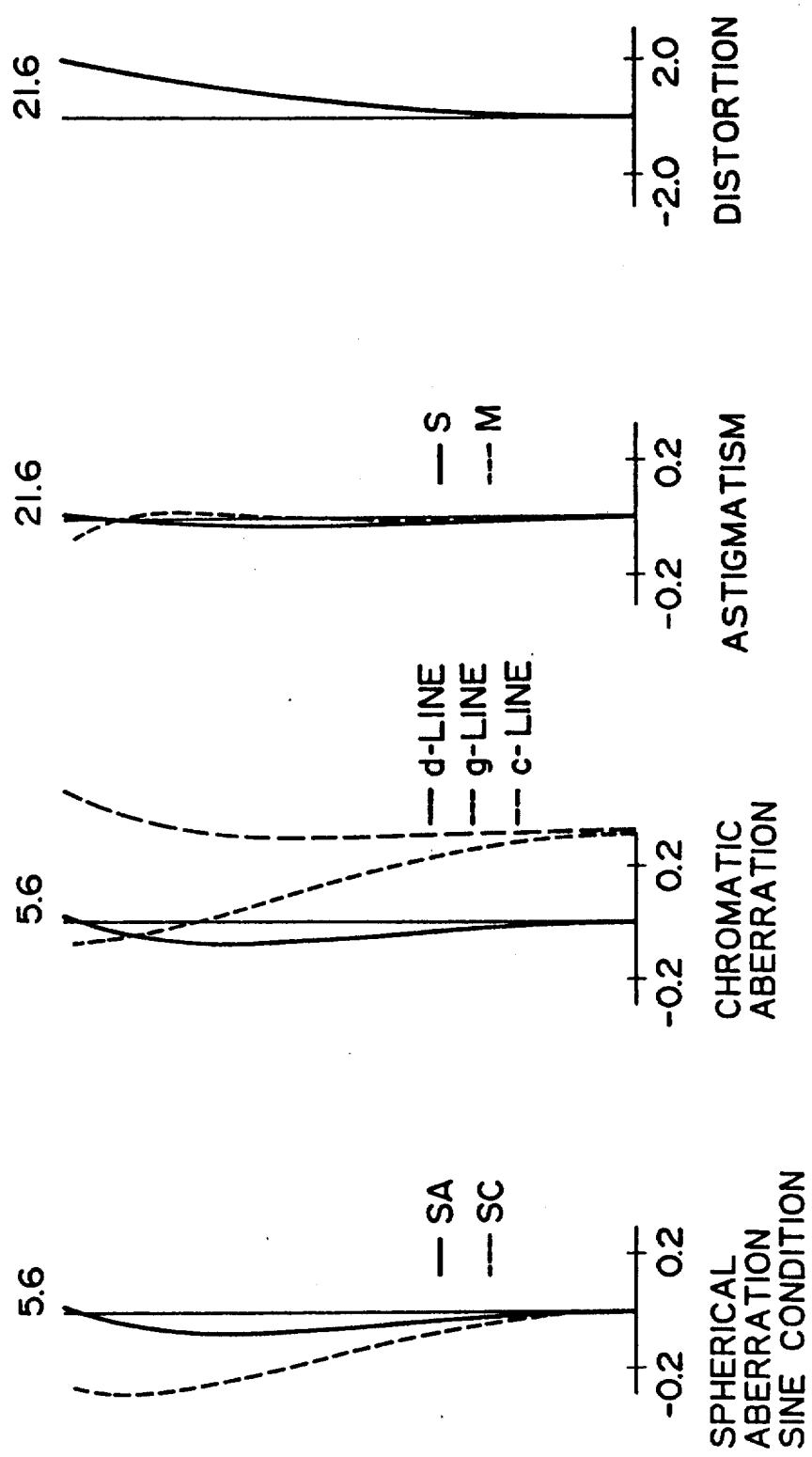

f = 100 mm

I  II  III  IV f = 300 mm

I  II III  IV

— S
--- M

FIG. 27
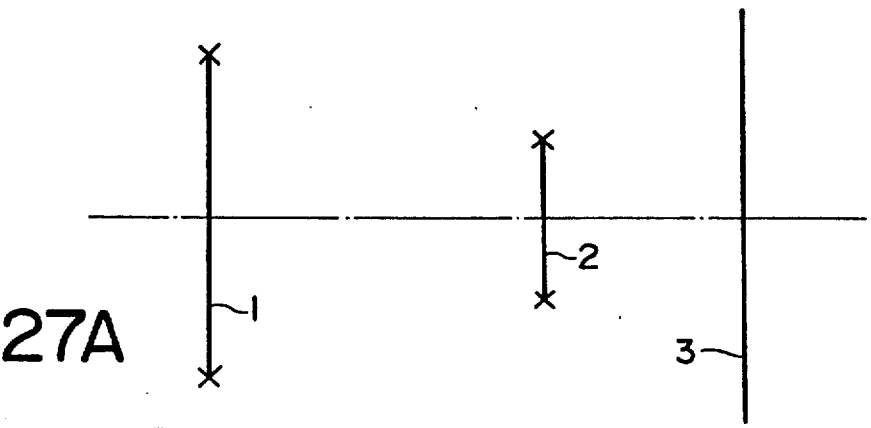
FIG. 27A
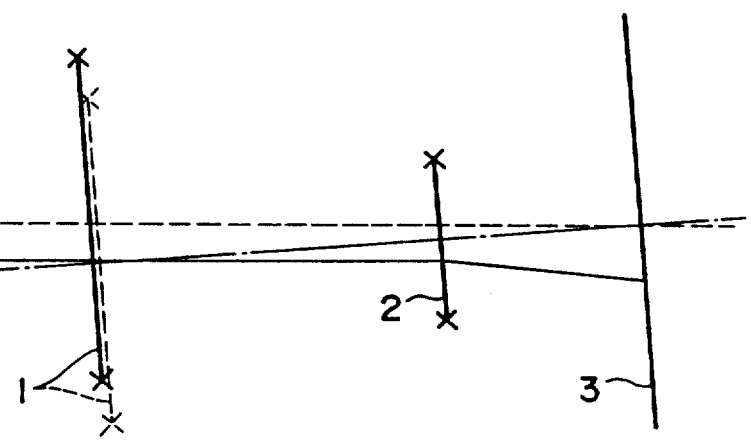
FIG. 27B
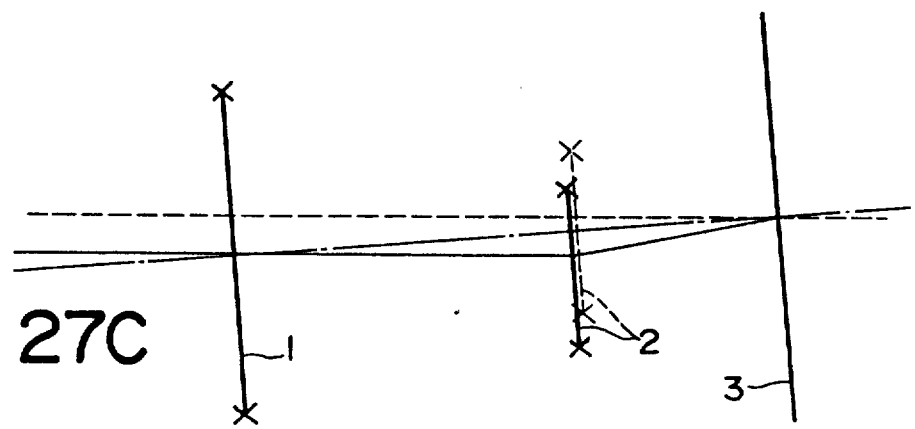
FIG. 27C

ZOOM LENS CAPABLE OF IMAGE BLUR COMPENSATION

BACKGROUND OF THE INVENTION

1. Field of the Invention

This invention relates to a picture taking lens capable of preventing image deterioration caused by accidental inclination or so-called a camera shake when a picture is being taken, and more particularly to a compensating means particularly suited to a zoom lens which has a variable focal length.

2. Description of the Prior Art

When taking a picture from a moving automobile or airplane, or when a long focus lens is used, a significant image deterioration caused by a camera shake tends to occur. Heretofore, many proposals have been made to provide means for compensating for image blur caused by camera shake.

As a simple means for compensating for image blur, in principle, in a lens system which comprises a plurality of lens groups 1 and 2 as shown in FIG. 27(A), there can be contemplated one compensation system, in which a lens group nearest to an object (hereinafter simply referred to as the "object side group") 1 in the lens system is decentered from the optical axis of the lens system in order to obtain a still image on an image surface 3.

As shown in FIG. 27(B), in the case that the optical axis of the lens system is inclined from an original position indicated by a broken line to a position indicated by a one-dotted chain line, image blur can be compensated by decentering the object side group 1, which is supposed to be in a position indicated by the broken line if the lens group 1 was decentered together with the lens system, to a position indicated by a solid line.

In this case, it is apparent that the object side group 1 may simply be moved in a direction perpendicular to the optical axis by an amount equal to that of the blur of an image which is formed by the group 1. Given that the focal length of the object side group 1 is $f_1$ and an angle of inclination of the whole lens which causes camera shake is $\omega_t$, the moving amount $\Delta Y$ can be expressed as follows;

$$\Delta Y = f_1 \cdot \omega_t$$

However, the object side group of an observation optical system usually has a large effective aperture, and this is more significant when the lens is a telephoto lens having a long focal length. Therefore, the load on a mechanism for moving the lens groups becomes large, and thus, the system eventually becomes large.

In view of the foregoing, in a lens system comprising a plurality of lens groups, there have been made several proposals, as seen, for example, in Japanese Patent Early Laid-open Publication No. Sho 62-203119 and Japanese Patent Early Laid-open Publication No. Sho 62-47011, in which a lens group nearer to an image, i.e., an image side group, is decentered to obtain a still image. That is, as shown in FIG. 27(C), in the case that the optical axis of a lens system is inclined from an original position indicated by a broken line, to a position indicated by a one-dotted chain line, image blur can be compensated by decentering the image side group 2, which is supposed to be in a position indicated by the broken line if the group 2 was decentered together with the lens system, to a position indicated by the solid line.

In a constitution as mentioned above, given that a composite focal length of a lens group nearer to the object than a lens group which is moved for compensation is $f_1$, an angle of inclination caused by camera shake is $\omega_t$, and a magnification of the image blur compensating lens group is $m_c$, the decentering of an image at the center of a screen can be reduced to zero by setting the moving amount $\Delta Y$ of the image blur compensating lens group in the direction within a plane perpendicular to the optical axis for compensating for image blur as follows;

$$\Delta Y = f_1 \cdot M \cdot \omega_t$$

wherein, $$M = m_c/(1 - m_c)$$

However, if a lens group, which is moved for focusing, is served by the image blur compensating lens group as disclosed in Japanese Patent Early Laid-open Publication No. Sho 62-47011, there arise problems such as a complicated mechanism, slow autofocus speed or the like.

Furthermore, in a zoom lens, there arises another problem, i.e., how to arrange the variable power lens group in relation to the image blur compensating group. That is, in the case that the image blur compensating group is placed in a position nearer to the object than the variable power lens, blur compensation is completed by the image blur compensating lens. Therefore, a coefficient of compensation showing the ratio of a moving amount with respect to a blur amount in any focal length to be changed by the zooming is established only in a single way and therefore, there can be obtained an easy control.

However, in the case of the zoom lens, as the lenses nearer to the object than the variable power lens group generally serve as a focusing lens group, the same problems as mentioned above arise.

On the other hand, in the case that the image blur compensating group is arranged in a position nearer to the image than the variable power lens group, the coefficient of compensation becomes, in general, a function of a composite focal length by a lens group nearer to the object than the image blur compensating group. Therefore, a calculation process is required to achieve obtaining a moving amount for compensation in accordance with each focal length.

SUMMARY OF THE INVENTION

The present invention was developed in view of the above-mentioned problems. It is therefore an object of the present invention to provide a zoom lens, in which a lens group nearer to an image than a variable power lens group serves as an image blur compensating group and yet, by adequately controlling the power of the image blur compensating group, the coefficient of compensation is not varied even if the focal length of the whole system is varied.

A zoom lens according to the present invention comprises three or more lens groups, with at least one lens group located in a position nearer to an image than a variable power lens group serving as an image blur compensating group which is able to move with respect to the remaining lens groups. The magnification $m_c$ of the image blur compensating group satisfies a relation ① or ② set forth below with respect to a composite focal length $f_1$ of the lens groups nearer to an object than the image blur compensating group;

$$m_c = 1/\{1 + (f_1/A)\} \qquad (1)$$

$$m_c = 1/[1 + \{f_1/(X-B)\}] \qquad (2)$$

wherein A and B are arbitrary constants, and X is the distance from the image blur compensating group to the image surface.

In case that a picture taking lens or a camera is inclined during exposure, the image blur compensating group is held in order not to follow the displacement of the remaining lens groups, thereby to compensate for an adverse effect caused by the blur, or means for moving the image blur compensating group in a direction leading into a plane generally vertical perpendicular to the optical axis is provided in order to forcefully move the image blur compensating group, thereby compensating for the adverse effects of blur.

BRIEF DESCRIPTION OF THE DRAWINGS

FIGS. 4 through 6 are schematic views showing a first embodiment of a lens holding mechanism for an image blur group according to the present invention, wherein FIG. 4 is a side view thereof, partly broken, FIG. 5 is a front view of FIG. 4, and FIG. 6 is a schematic view showing a modified embodiment of a holding mechanism of the image blur compensating group.

FIGS. 8 through 16 are schematic views showing a first example of a lens constitution for an image blur compensating group according to the present invention. FIG. 9 is an aberration diagram thereof, FIG. 10 is a sectional view of lenses with a focal length of 100 mm, FIG. 11 is an aberration diagram thereof, FIG. 12 is a sectional view of the lenses after the image blur compensating group is moved when the whole lens system is inclined at 1° for a focal length of 50 mm, FIG. 15 is an astigmatism diagram for the state of FIG. 12, and FIG. 16 is likewise an astigmatism diagram for a focal length of 100 mm.

FIGS. 17 through 26 show a second example of lens constitution for image blur compensation according to the present invention, wherein FIG. 17 is a sectional view of the lenses with a focal length of 100 mm, FIG. 18 is an aberration diagram thereof, FIG. 19 is a sectional view of lenses with a focal length of 300 mm, FIG. 20 is an aberration diagram thereof, FIG. 21 is a sectional view of lenses after the image blur compensating group is moved when the whole lens system is inclined at 1° for a focal length of 100 mm, FIG. 22 is a sectional view of lenses after the image blur compensating group is moved when the whole lens system is inclined at 1° for a focal length of 300 mm, FIGS. 25 and 26 asatignatism diagrams for the state of FIGS. 21 and 22.

FIGS. 27(A) through 27(C) are illustrations showing the principle of the conventional image blur compensating mechanism.

DETAILED DESCRIPTION OF THE EMBODIMENTS

The embodiments of the present invention will be described hereunder with reference to the accompanying drawings.

Figure 1:
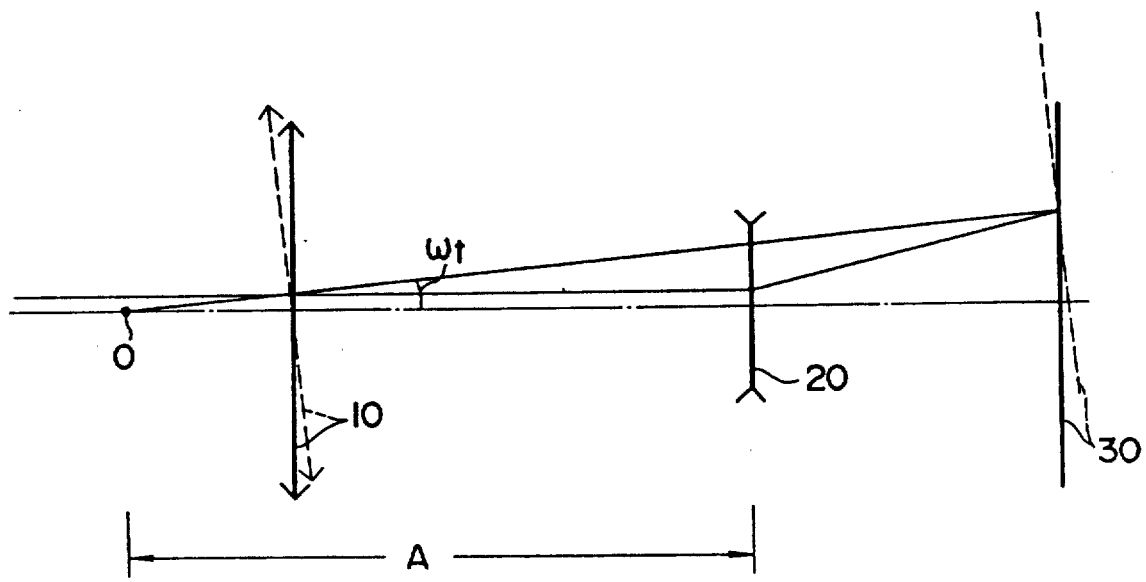
FIGS. 1 through 3 are views explaining the principle of a zoom lens according to the present invention.

FIG. 1 shows an arrangement for image blur compensating. In the figure, an image blur compensating group 20 is arranged adjacent to a lens group 10 of a focal length $f_1$ at the side of an image surface 30. Given that an angle of inclination of the whole lens system is $\omega_t$, the moving amount $\Delta Y$ of the image blur compensating group 20 is expressed as follows;

$$\Delta Y = f_1 \cdot M \cdot \omega_t$$

wherein, $$M = m_c/(1 - m_c)$$

That is, by moving the image blur compensating group 20 in the direction leading into a plane generally normal to the optical axis by $\Delta Y$, the adverse effect of blur can be reduced.

Let $f_1 \cdot M$ equal a constant A and a lateral magnification $m_c$ of the image blur compensating group be equal to $f_1$. And, if $$m_c = 1/\{1 + (f_1/A)\} \qquad (1)$$

thus, the value of the moving amount $\Delta Y$ with respect to the angle of inclination $\omega_t$ is not varied even if $f_1$ is varied by zooming.

The image blur compensating group 20 can compensate for blur by means of movement in the direction leading into the plane normal to the optical axis. In the case that the angle of blur is small, however, a similar effect can be obtained even by a rotary motion around a certain fixed point paraxially. In the case of a rotary motion, the mechanism can be simplified with ease.

Therefore, in the case that the image blur compensating group 20 is a thin lens and the angle of inclination $\omega_t$ is proximate to O, a relation between the angle $\omega_t$ of inclination and the moving amount $\Delta Y$ is as shown in FIG. 1. In the figure, a point O spaced from the image blur compensating group 20 by a distance A (reference numeral is + in the advancing direction of a light flux) is established. In the case that the whole lens system is inclined by the angle $\omega_t$ around this point O, a relative displacement amount with respect to the remaining lens groups of the image blur compensating group fixed with respect to a space coordinate becomes $\Delta Y$.

In other words, in the case that the point O spaced from the image blur compensating group 20 by A is established around the point O, if the image blur compensating group 20 remains in the original position at the fixed coordinate with respect to the object, the image blur compensating group 20 is moved by $\Delta Y$ in order to compensate for the adverse effect caused by the rotary inclination in the coordinate system fixed with respect to the image surface 30.

As a method for relatively displacing the position of the image blur compensating group 20 by means of rotation, there can be employed, for example, a known system for fixing the image blur compensating group with respect to the space coordinate by a gyro.

The fact that A is a constant here means that the point O generally moves together with the image blur compensating group when zooming.

From a view point of practical use, however, it is more convenient that the point O is spaced from the image surface by a fixed distance. The reason is that a steady point with respect to camera shake, i.e., the point fixed with respect to the space coordinate in which the zoom lens is, is greatly affected by the fixed position when a camera, a lens, etc. are fixed by a tripod and it is difficult to consider that the displacement is caused by the movement of the image blur compensating group in accordance with the zooming.

From this point of view, the relation ① is transformed to obtain a relation ②.

$$m_c = 1/[1 + \{f_1/(X-B)\}] \qquad (2)$$

A relation between the moving amount $\Delta Y$ of the image blur compensating group 20 and the angle $\omega_t$ of inclination is expressed as follows;

$$\Delta Y = (X-B)\cdot\omega_t$$

Figure 2:
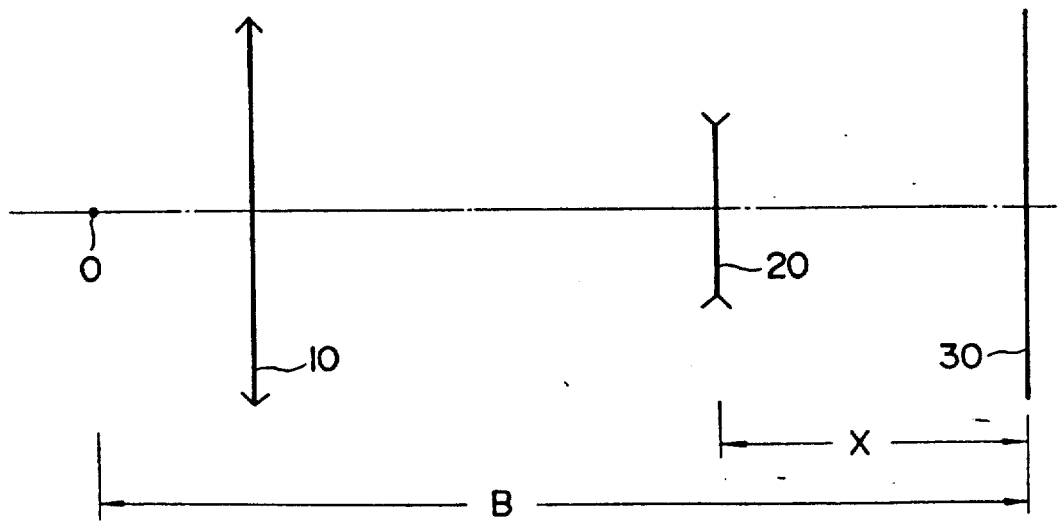

In this state, as shown in FIG. 2, B is a distance from the fixed point O to the image surface, and x is a distance from the image blur compensating group to the image surface. When the whole lens system is rotated around the fixed point O by angle $\omega_t$, the moving amount of the image blur compensating group fixed with respect to the space coordinate becomes $\Delta Y$.

In this way, when the image blur compensating group satisfying the relation ② is brought to a state able to rotate around the fixed point O and the angle of the image blur compensating group with respect to the object is invariable, even in the case that the focal length of the whole lens system is varied, the best blur compensation can always be effected without varying the coefficient of compensation of the compensating mechanism.

Figure 3A:
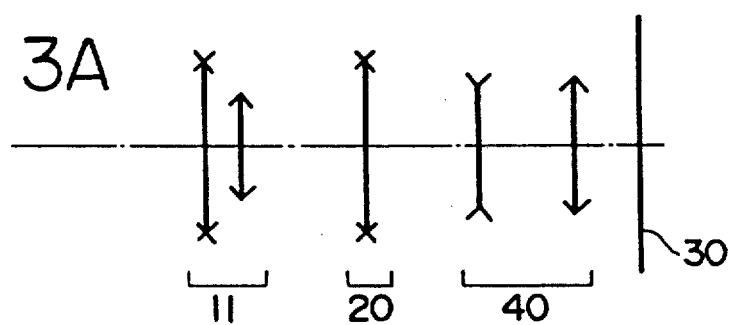
Figure 3B:
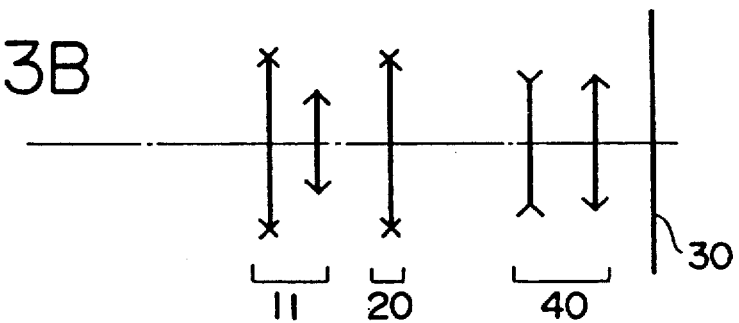
Figure 3C:
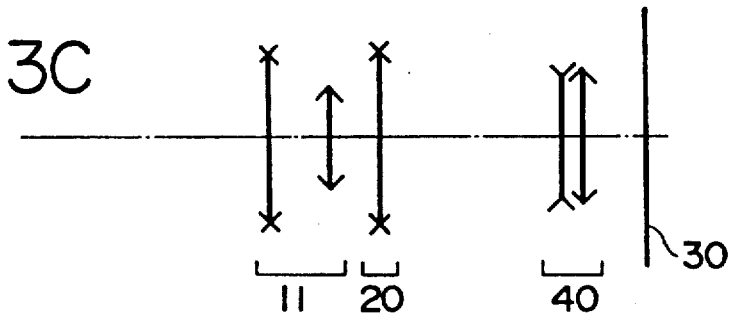

Furthermore, in the case that an image position compensating lens group 40 for compensating for the movement of an image position according to the variation of a composite focal length of the variable power lens group 11 is provided in order to maintain the image blur compensating group 20 in a distance fixed to the image surface as shown in FIGS. 3(A) through 3(C), a mechanism for moving the image blur compensating group 20 in the direction of the optical axis is not required and thus, advantages as far as simplicity of the image blur compensating mechanism are achieved.

The position of the variable power lens group 11 when the composite focal length $f_1$ of the variable power lens 11 is varied is determined in such a manner as to satisfy the condition ① with respect to the focal point position at the front side of the image blur compensating group 20.

This image position compensating lens group 40 may include a single lens group or otherwise, it, like an ordinary zoom lens, may include a compensation group having a generally afocal exit and an imaging master group.

A mechanism for constituting the above-mentioned image blur compensating system will be described next by way of three examples.

Figure 4:
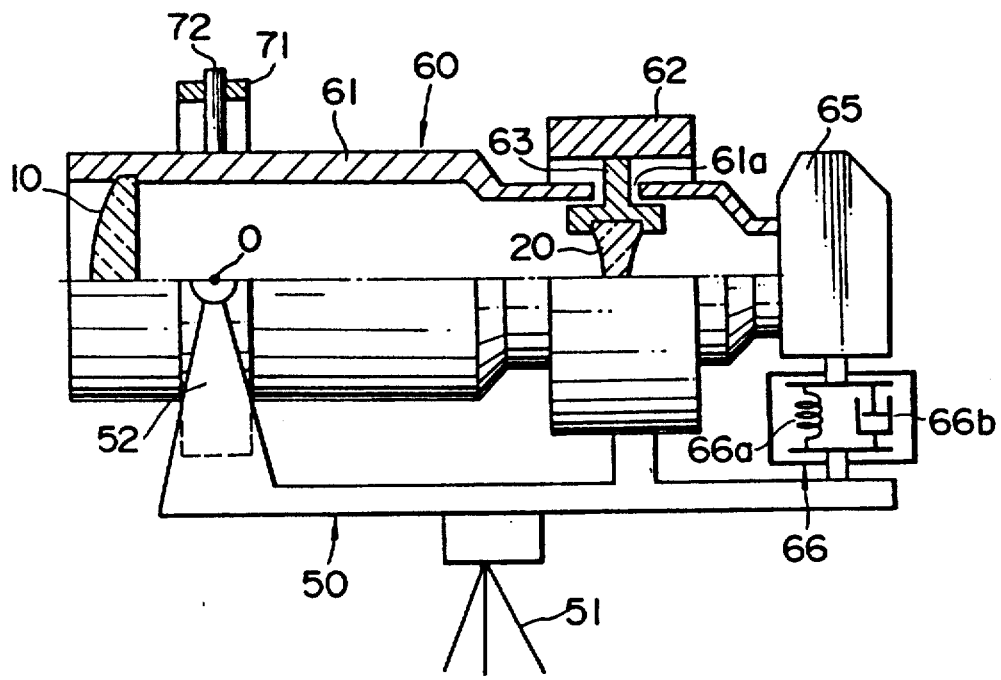

A mechanism of FIG. 4 comprises a mount 50 with a tripod 51 fixed thereunder, a telephoto lens 60 having the afore-mentioned image blur compensating function, and a camera body 65 with a lens mounted thereon.

A lens-barrel of the telephoto lens 60 containing a lens group comprises a movable lens-barrel 61 movable with respect to the mount 50, and a fixed lens-barrel 62 fixed to the mount 50.

The movable lens-barrel 61 is supported on the mount 50 through a gimbal bearing 70 at a fixed point thereof at the side of an object to be taken, and is secured to the camera body 65 at a base portion thereof.

Figure 5:
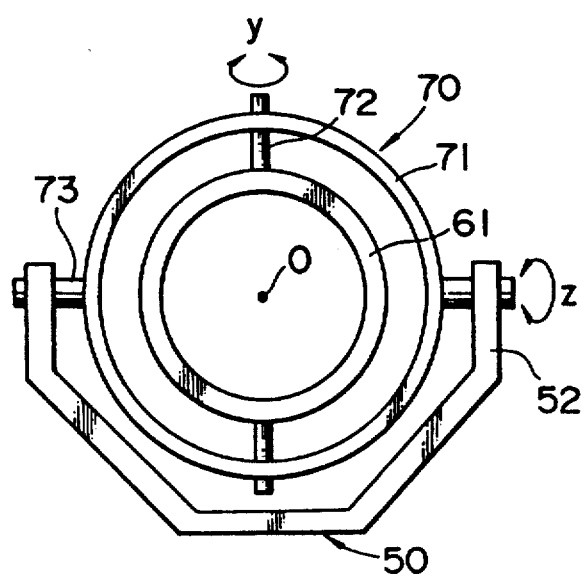

The gimbal bearing 70, as shown in FIG. 5, is mounted for rotation on a U-shaped supporting piece 52 attached to the front end of the mount 50. The gimbal bearing 70 comprises a ring 71 surrounding the outer periphery of the movable lens-barrel 61, a first shaft 72 for rotationally connecting the ring 71 with the movable lens-barrel 61, and a second shaft 73 for rotationally connecting the ring 71 with the supporting piece 52.

Let the direction of the optical axis of the lens be the x-axis. Then, establish y and z axes which intersect with each other at right angles within a plane normal to the x-axis. The first shaft 72 gives the movable lens-barrel a freedom for rotating about the y-axis and the second shaft 73 gives the movable lens-barrel a freedom for rotating about the z-axis.

The camera body 65 is mounted on the mount 50 through a shock absorbing mechanism 66 having a spring 66a and a buffer cylinder 66b.

By means of two spot support by the gimbal bearing 70 and the shock absorbing mechanism 66, the movable lens-barrel 61 is displaceably mounted on the mount 50.

On the other hand, the fixed lens-barrel 62 is formed in a cylindrical shape surrounding the outer periphery of the base portion of the movable lens-barrel 61. The fixed lens-barrel 62 is provided at upper and lower positions of its inner periphery with a lens frame 63 projecting inward. The lens frame 63 penetrates through an opening 61a formed in the movable lens-barrel 61 and holds the image blur compensating group 20 within the movable lens-barrel 61. Accordingly, only the image blur compensating group 20 in the lens system is directly fixed to the mount 50.

The above-mentioned mechanism forms a rotary movement mechanism for rotating the image blur compensating group 20 about a point 0 on the optical axis with respect to a dynamic inclination of the telephoto lens 60.

The front end portion of the telephoto lens 60 is easy to move when compared with the tripod 51 and the mount 50. Therefore, the neutral position of the optical axis of the image blur compensating group 20 is displaced from the optical axis of the whole lens system depending on the position of the lens. However, this only has a small effect to its performance.

Strictly speaking, the supporting point and the image blur compensating group are required to be firmly fixed to a stationary system (mount 50) so as not to receive an adverse effect by shake of the camera. However, as a small amount of shake can be absorbed in actual practice, adverse effect on the imaging performance can mostly be neglected even when the manner of fixation has a certain degree of freedom.

The conventional image blur compensating mechanism could not compensate for the effects of blur of a high frequency caused by actuation of a shutter and a mirror. In the example of FIG. 4, however, as the image blur compensating group 20 is fixed to the mount 50, the occurrence of blur on the screen can completely be prevented in principle.

Figure 6:
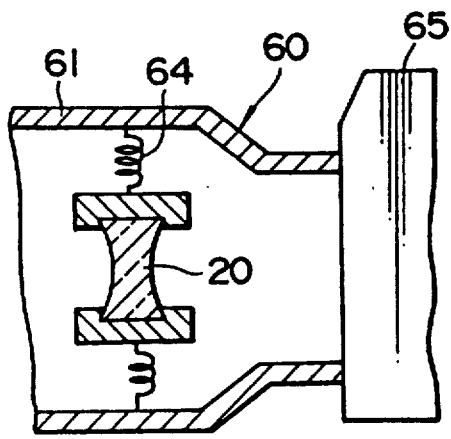

FIG. 6 shows a modification of FIG. 4, in which the image blur compensating group 20 is supported by a spring 64 within the movable lens-barrel 61. This constitution is effective when a cycle of displacement of the image blur compensating group 20 is longer than a cycle of shake of a combined telephoto lens 60 and camera body 65.

Figure 7:
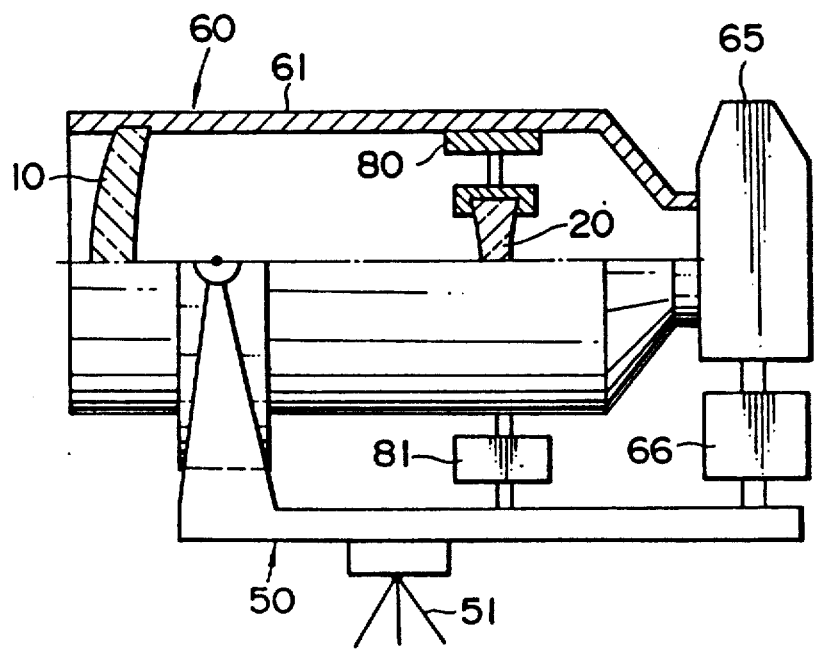
FIG. 7 is a schematic view showing a second embodiment of a lens holding mechanism for an image blur compensating group according to the present invention.

FIG. 7 shows a mechanism for driving the image blur compensating group 20 in the y-z directions by an actuator 80 disposed within the movable lens-barrel 61. The displacement caused by camera shake is detected, as an angle of displacements by an acceleration sensor 81 disposed between the movable lens-barrel 61 and the mount 50. And, based on a result of this detection, the actuator 80 is controlled so that the image blur compensating group 20 would not be moved with respect to a stationary system (mount 50) during camera shaking.

In the image blur compensating of the present invention, as the image blur compensating group 20 is a comparatively light lens group near to the image, the mass of the object to be controlled by the actuator 80 is small and therefore, a high frequency control is available.

The constitution of FIGS. 6 and 7 form a vertical movement mechanism for moving the image blur compensating group 20 into a plane generally normal with respect to the optical axis to cope with a dynamic inclination of the telephoto lens 60.

In the above-mentioned embodiment, a whole camera assembly including the telephoto lens 60 and camera body 65 is mounted on the mount 50. However, this constitution is substantially equivalent to the constitution in which a fixed point 0 is fixed to a stationary system by means of a gyro or the like.

LENS CONSTITUTION EXAMPLE 1

FIGS. 8 through 16 shows an example of a lens constitution which satisfies the conditions of the present invention.

Shown here is a lens system comprising three lens groups of a focal length of 50 to 100 mm and F number of 4.0 to 5.6. In this example, the focal length can be varied by displacing the second and third groups II and III in the direction of the optical axis. The group which functions as the image blur compensating group, is the third group III.

This lens system is established as such that the condition of constant $A = -120$ of the relation ① is satisfied.

Therefore, the magnification $m_c$ is expressed as follows;

$$m_c = 1/\{1 - (f_1/120)\}$$

The moving amount $\Delta Y$ of the image blur compensating group with respect to the angle $\omega_t$ of inclination of the whole lens system is expressed as follows;

$$\Delta Y = -120 \cdot \omega_t$$

irrespective of variation of the focal length of the whole system.

Let the direction of the optical axis be the x-axis here when the angle of inclination is zero. Then, establish y and z axes which intersect each other at right angles within a plane normal to the x-axis. Suppose that the inclination of the optical axis takes place within the plane x—y.

A composition of concrete numeric values of the lens is as shown in TABLE 1.

In the table, "Fno." is an F number, "f" is a focal length in d-line (wavelength of 588 nm), "w" is a half angle of view, "r" is the radius of curvature of each surface of a lens, "d" is a thickness of a lens or an air space, "n" is a refractive index in the d-line, and "ν" is the Abbe number of a lens.

Values of d6 and d16 are varied in accordance with the movement of the second and third lens groups. Variation of these spaces corresponding to each focal length is as shown in TABLE 2.

TABLE 1

| Fno. = 1:4.0~1:6.5 | | f = 50~100 mm | w = 23.8°~12.1° | |
|---|---|---|---|---|
| Face No. | r | d | n | ν |
| 1 | 130.643 | 1.80 | 1.83400 | 37.2 |
| 2 | 33.647 | 4.56 | | |
| 3 | 43.314 | 1.53 | 1.77250 | 49.6 |
| 4 | 26.035 | 2.47 | | |
| 5 | 27.300 | 4.30 | 1.80518 | 25.4 |
| 6 | 53.398 | variable | | |
| 7 | 31.774 | 3.20 | 1.71300 | 53.8 |
| 8 | −931.695 | 6.29 | | |
| 9 | 22.050 | 2.87 | 1.73400 | 51.5 |
| 10 | 68.215 | 1.00 | | |
| 11 | −116.644 | 4.17 | 1.80518 | 25.4 |
| 12 | 19.031 | 3.93 | | |
| 13 | −24.363 | 2.03 | 1.71300 | 53.8 |
| 14 | −26.783 | 0.10 | | |
| 15 | 75.461 | 2.50 | 1.65844 | 50.9 |
| 16 | 36.642 | variable | | |
| 17 | 236.392 | 1.40 | 1.80400 | 46.6 |
| 18 | 24.000 | 4.70 | 1.59270 | 35.3 |
| 19 | −43.608 | 4.39 | | |
| 20 | −37.027 | 1.70 | 1.80400 | 46.6 |
| 21 | 187.481 | 0.10 | | |
| 22 | 36.540 | 1.73 | 1.59270 | 35.3 |
| 23 | 50.578 | | | |

TABLE 2

| f | d6 | d16 | $f_1$ | $m_c$ |
|---|---|---|---|---|
| 50 | 30.935 | 6.518 | 35.294 | 1.417 |
| 60 | 21.690 | 6.056 | 40.000 | 1.500 |
| 70 | 15.085 | 5.644 | 44.211 | 1.583 |
| 80 | 10.133 | 5.270 | 48.000 | 1.667 |
| 90 | 6.280 | 4.935 | 51.409 | 1.750 |
| 100 | 3.199 | 4.628 | 54.545 | 1.833 |

Figure 8:
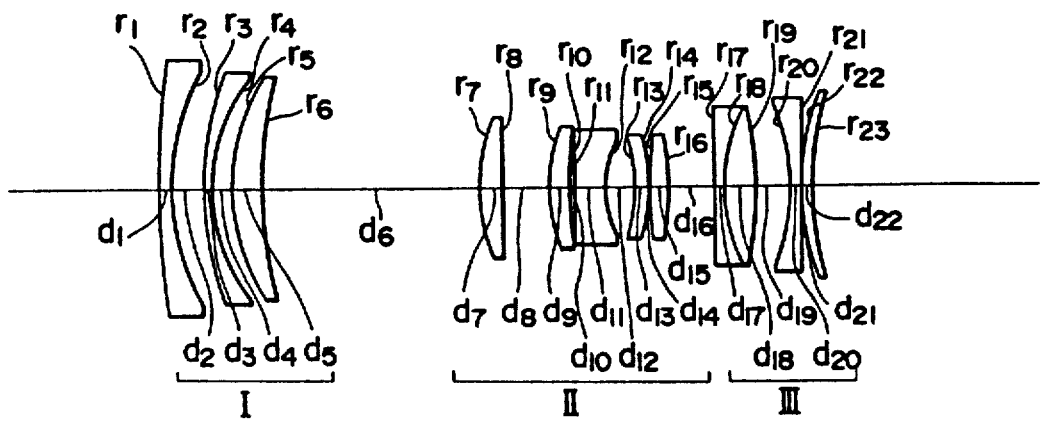
Figure 10:
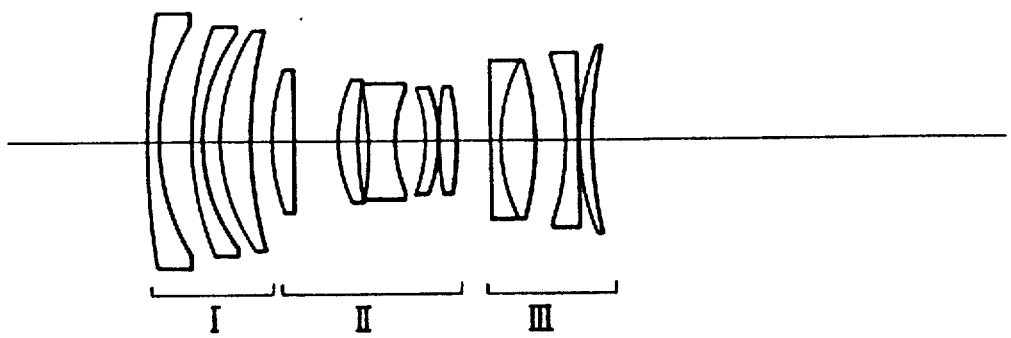

FIG. 8 shows the state for a focal length of 50 mm. In this state, each aberration is as shown in FIG. 9. The arrangement for a focal length of 100 mm is as shown in FIG. 10. In this state, each aberration is as shown in FIG. 11.

Figure 12:
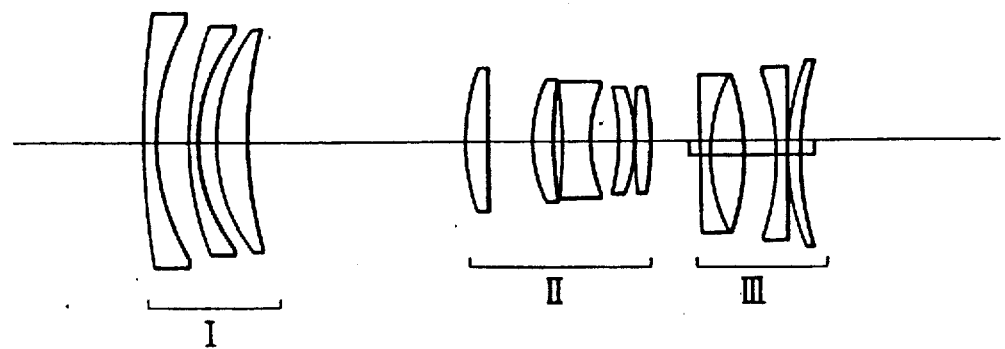

FIG. 12 shows the state of movement of the image blur compensating group when the whole lens system having a focal length of 50 mm is inclined at 1°.

In general, when a lens of a focal length of 100 mm is inclined at 1°, a spot image is shifted by about 1.75 mm. In this lens system, however, in any state of the focal length within the range of 50 mm to 100 mm, a fading amount of the spot image can be maintained small, as shown in FIGS. 13 and 14, by shifting the third group III in the direction leading into a plane normal to the optical axis.

Figures 13A, 13B, 13C:
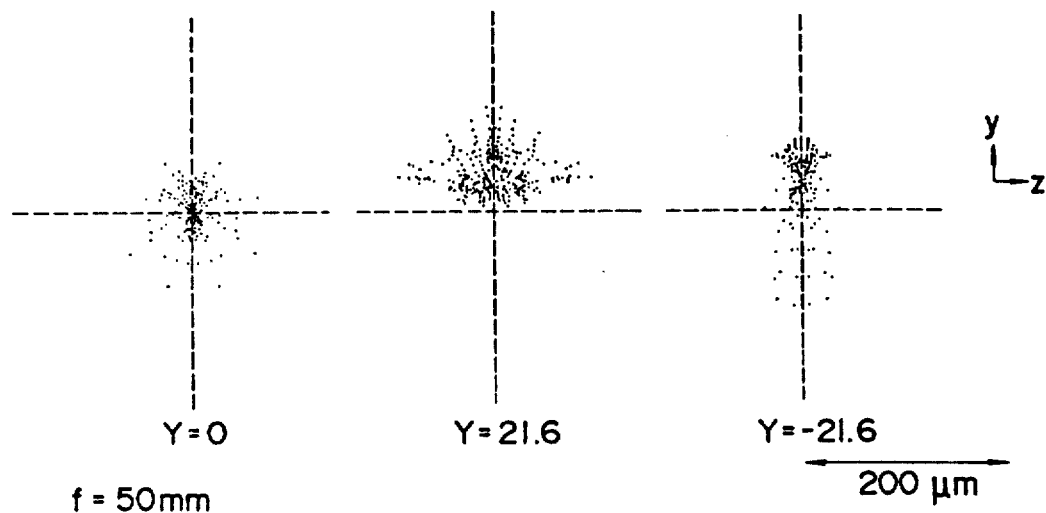
FIGS. 13(a), 13(b) and 13(c) are spot diagrams for the state of FIG. 12, FIGS. 14(a), 14(b) and 14(c) are likewise spot diagrams for a focal length of 100 mm.
Figures 14A, 14B, 14C:
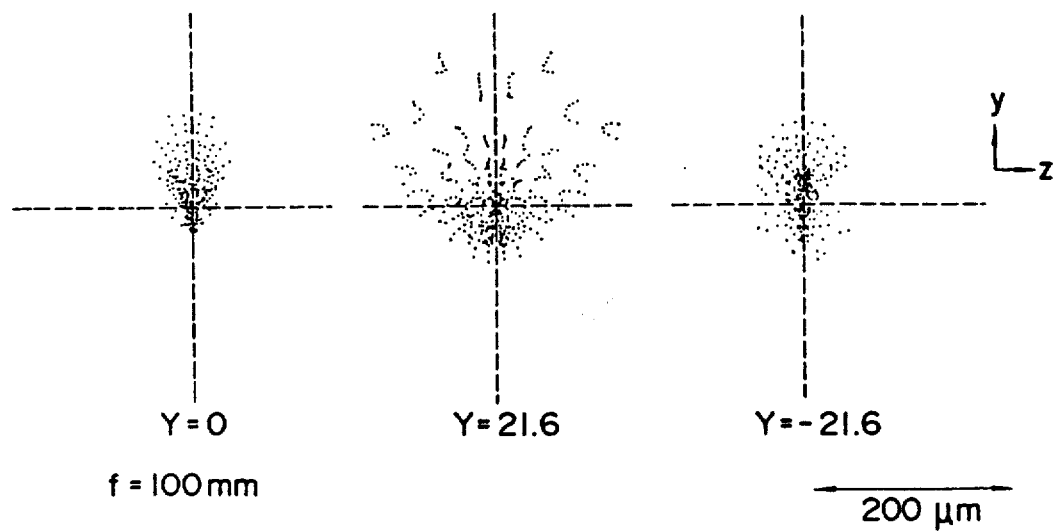

FIGS. 13 and 14 respectively show a spot diagram at three positions having a different image height in the y-direction for focal lengths of 50 mm and 100 mm. The intersecting points of the broken lines of FIGS. 13(a) through 13(c) and FIGS. 14(a) through 14(c) respectively show spot image positions by a principal ray of light when the inclinations are zero, respectively. These figures show the three points of $(y,z)=(0,0),(21.6,0),(-21.6,0)$ in a y—z coordinate in which the intersecting point between the image surface and the x-axis is established as the origin.

As is shown in the figures, even at a peripheral portion of a screen where the picture quality is deteriorated the most due to generation of a curvature of image surface after correction, the shading amount of the spot image can be restrained to about 0.2 mm in diameter.

Figure 15:
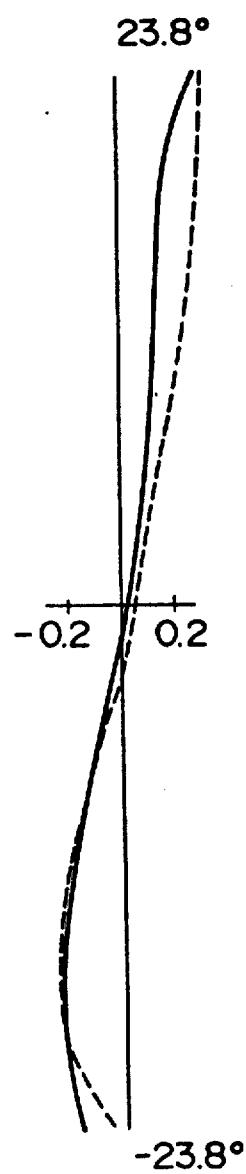
Figure 16:
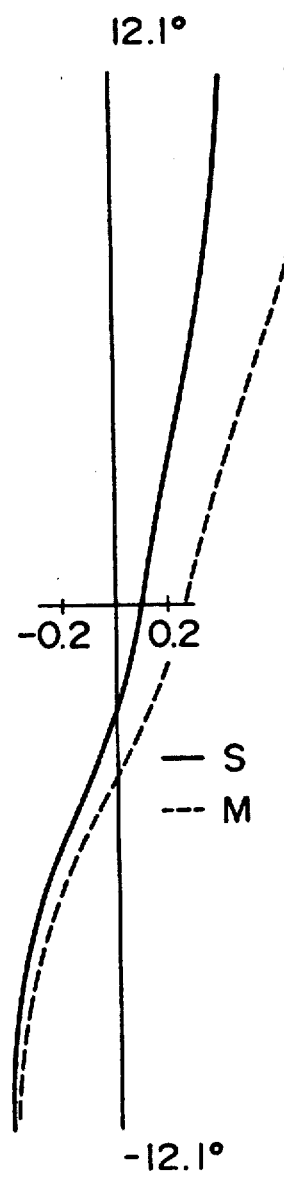

FIG. 15 shows an astigmatism after the movement of the third lens group III for compensating for the image blur when the focal length is 50 mm, and FIG. 16 shows an astigmatism after correction when the focal length is 100 mm.

LENS CONSTITUTION EXAMPLE 2

FIGS. 17 through 26 shows an example of lens constitution which satisfies the conditions of the present invention.

Shown here is a lens system comprising four lens groups of a focal length of 100 to 300 mm and F number of 5.6. In this example, the focal length can be varied by displacing second group II and third group III in the direction of the optical axis. The group which functions as the image blur compensating group, is the second group II.

This lens system is established as such that the condition of constant B=238.658 of the relation ② is satisfied.

Therefore, the magnification $m_c$ is expressed as follows;

$$m_c = 1/[1+\{f_1/(X-238.658)\}]$$

The required moving amount $\Delta Y$ of the image blur compensating group with respect to the angle $\omega_t$ of inclination of the whole lens system can be expressed as follows;

$$\Delta Y = (X - 238.658) \cdot \omega_t$$

Let the direction of the optical axis be the x-axis when the angle of inclination is zero. Then, establish y and z axes which intersect with each other at right angles within a plane vertical to the x-axis. Suppose that the inclination of the optical axis takes place within the plane x-y.

A composition of concrete numeric values of the lens is as shown in TABLE 3.

Symbolic characters in the table are the same to those of the first embodiment.

It is d5, d10 and d13 which vary in space in accordance with the variation of the focal length. Variation of these spaces corresponding to each focal length is as shown in TABLE 4.

As the composite focal length $f_1$ of a lens group nearer to the object than the image blur compensating group is equal to the focal length of the first group I in this example, it becomes a invariable constant by the zooming and a relation of $f_1 = 139.71$ mm is satisfied.

Figure 17:
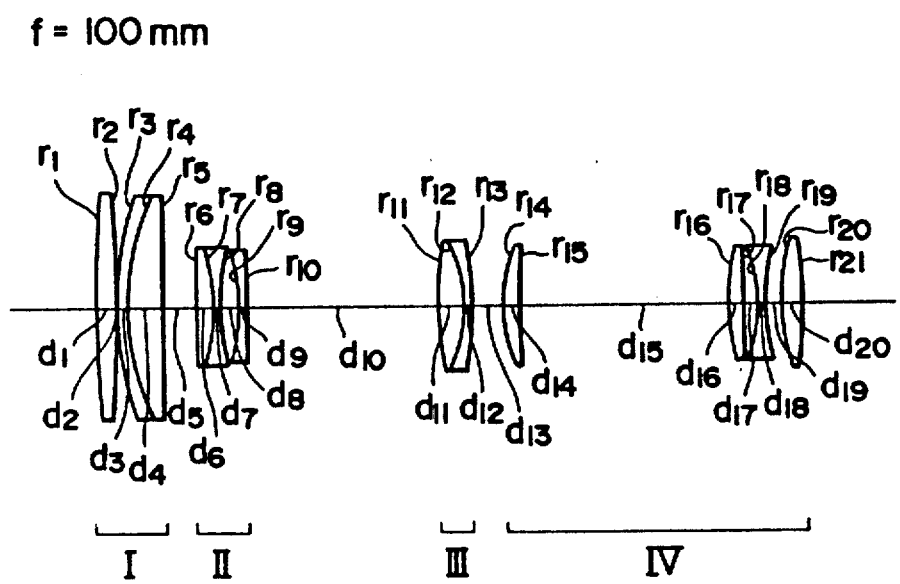
Figure 19:
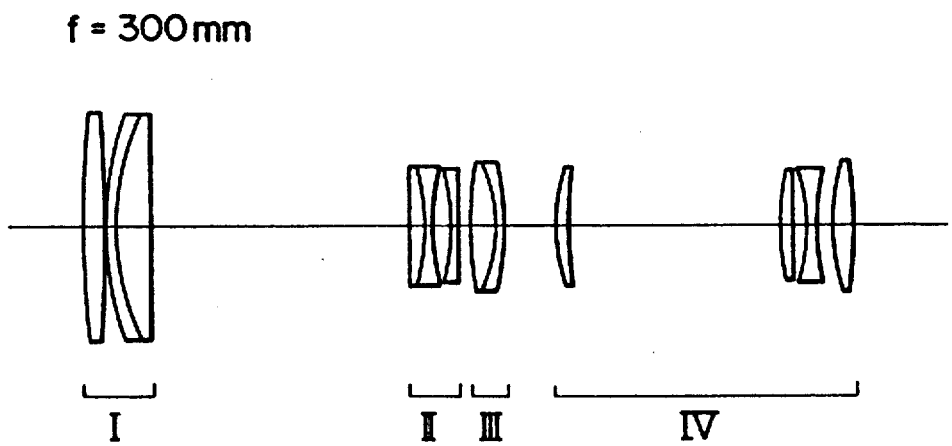

FIG. 17 shows the state for a focal length of 100 mm. In this state, each aberration is as shown in FIG. 18. The arrangement when the focal length is 300 mm is as shown in FIG. 19. In this state, each aberration is as shown in FIG. 20.

Figure 21:
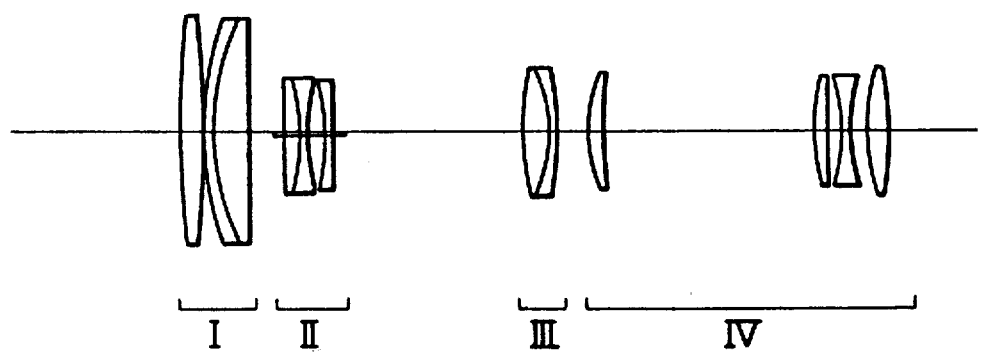
Figure 22:
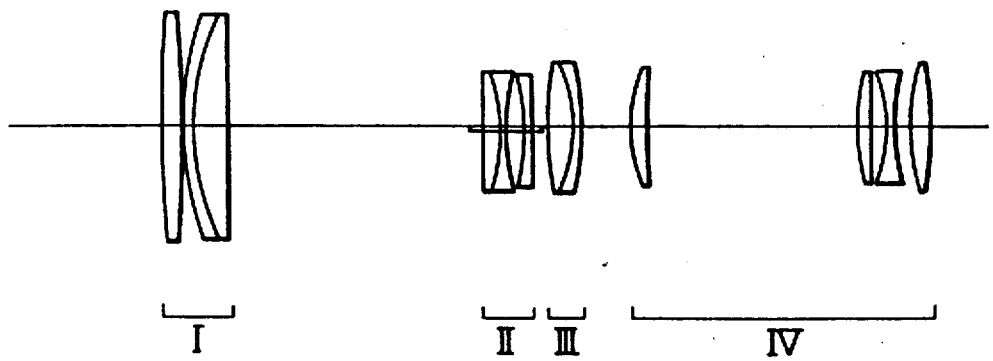

FIGS. 21 and 22 respectively show the moving state of the image blur compensating group (second group II) when the focal lengths are 100 mm and 300 mm, respectively and the whole lens system is inclined at 1°.

TABLE 3

| Fno. = 1:5.6 | f = 100~300 mm | | w = 12.4°~4.0° | |
|---|---|---|---|---|
| Face No. | r | d | n | v |
| 1 | 292.345 | 4.80 | 1.48749 | 70.2 |
| 2 | −544.997 | 0.10 | | |
| 3 | 81.679 | 2.40 | 1.80518 | 25.4 |
| 4 | 57.977 | 8.20 | 1.48749 | 70.2 |
| 5 | −2918.895 | variable | | |
| 6 | ∞ | 4.00 | 1.80518 | 25.4 |
| 7 | −46.049 | 1.60 | 1.69680 | 55.5 |
| 8 | 57.256 | 4.00 | | |
| 9 | −49.454 | 1.80 | 1.72916 | 54.7 |
| 10 | −3111.125 | variable | | |
| 11 | 94.417 | 5.70 | 1.51633 | 64.1 |
| 12 | −34.902 | 2.00 | 1.80518 | 25.4 |
| 13 | −65.341 | variable | | |
| 14 | 40.247 | 3.50 | 1.48749 | 70.2 |
| 15 | 151.872 | 48.36 | | |
| 16 | 53.273 | 3.20 | 1.72825 | 28.5 |
| 17 | 716.932 | 3.22 | | |
| 18 | −37.372 | 2.00 | 1.80400 | 46.6 |
| 19 | 49.181 | 3.64 | | |
| 20 | 48.497 | 4.90 | 1.51633 | 64.1 |
| 21 | −97.142 | | | |

TABLE 4

| f | d5 | d10 | d13 | X | $m_c$ |
|---|---|---|---|---|---|
| 100 | 7.709 | 44.640 | 7.309 | 190.949 | −0.5186 |
| 150 | 33.679 | 34.158 | 4.321 | 177.478 | −0.7791 |
| 200 | 46.594 | 23.707 | 4.777 | 167.484 | −1.0385 |
| 250 | 54.307 | 13.316 | 7.474 | 159.790 | −1.2963 |
| 300 | 59.428 | 2.999 | 11.691 | 153.690 | −1.5522 |

In this lens system, a fading amount of the spot image can be maintained small as shown in FIGS. 23 through 26 by shifting the image blur compensating group in the direction leading into a plane vertical to the optical axis.

Figures 23A, 23B, 23C:
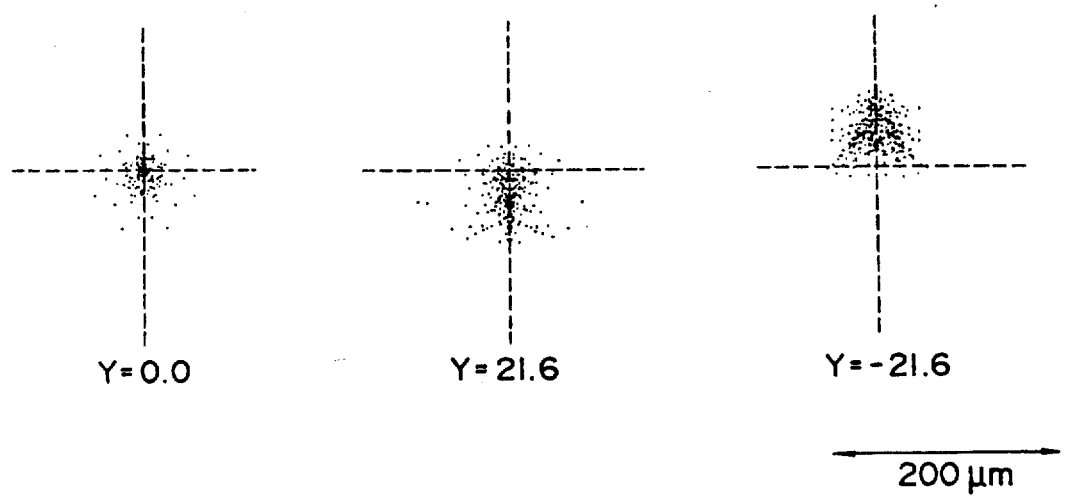
FIGS. 23(a), 23(b) and 23(c) and FIG. 24(a), 24(b) and 24(c) are spot diagrams in the state of FIG. 21, FIGS. 24(a), 24(b) and 24(c) are spot diagrams in the state of FIGS. 21 and 22.
Figures 24A, 24B, 24C:
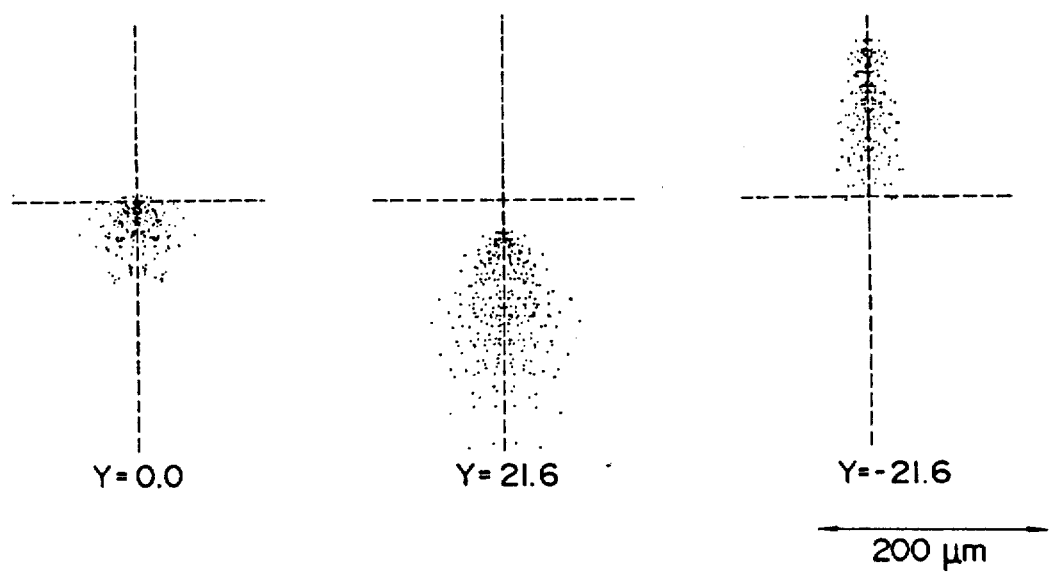

FIGS. 23 and 24 respectively show a spot diagram at three positions having a different image height in the y-direction in the focal length of 100 mm and 300 mm. The intersecting points of the broken lines of FIGS. 23(a) through 23(c) and FIGS. 24(a) through 24(c) respectively show spot image positions by a principal ray of light when the angles are zero, respectively. These figures show the three points of $(y,z)=(0,0),(21.6,0),(-21.6,0)$ in a y—z coordinate in which the intersecting point between the image surface and the x-axis is established as the origin.

Figure 25:
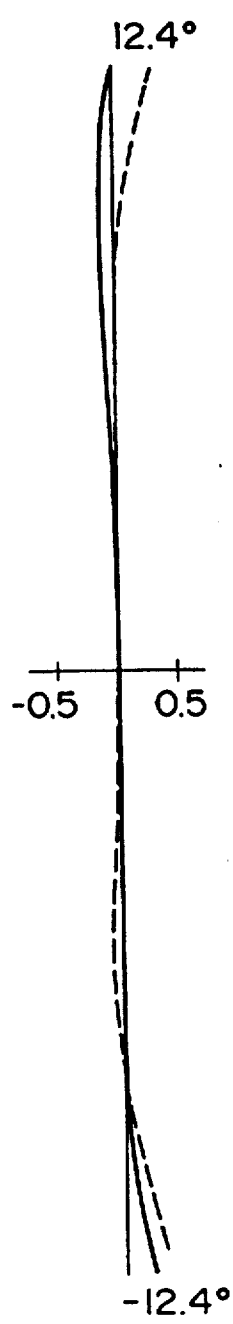
Figure 26:
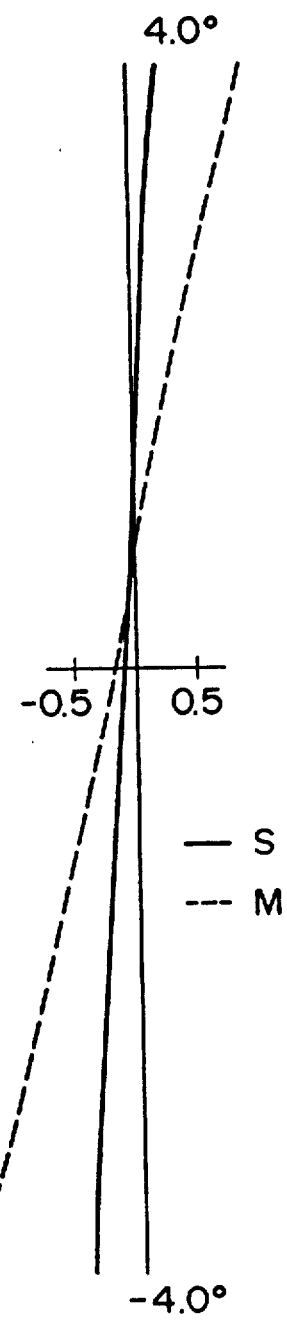

FIG. 25 shows astigmatism after the movement of the second group II for compensating for the image blur when the focal length is 100 mm, and FIG. 26 shows an astigmatism after correction when the focal length is 300 mm.

As is shown in the figures, even at a peripheral portion of a screen where the picture quality is deteriorated the most due to generation of a curvature of the image surface after correction, the shading amount of the spot image can be restrained to about 0.2 mm in diameter.

What is claimed is:

1. A zoom lens comprising three or more lens groups as an optical system, with a variable power lens group serving as an image blur compensating group which is able to displace with respect to the remaining lens groups, a magnification $m_c$ of said image blur compensating group satisfying the relation with respect to a composite focal length $f_1$ of the lens groups nearer to an object than said image blur compensating group, such that $$m_c = 1/\{1 + (f_1/A)\}$$

wherein A is an arbitrary constant.

2. A zoom lens according to claim 1,
wherein said lens groups comprise three lens groups with first, second and third lens groups arranged in this order from the side of an object to be taken, said third lens group serves as said image blur compensating group, and said second and third lens groups serve as said variable power lens group.

3. A zoom lens according to claim 1,
which includes an image position correcting lens group located at a position nearer to said image than said image blur compensating group and adapted to maintain constant the distance from said image blur compensating group to an image surface.

4. A zoom lens according to claim 1,
which includes a rotary movement mechanism for rotating said image blur compensating group around a point on the optical axis with respect to a dynamic inclination of the whole said optical system.

5. A zoom lens according to claim 1,
which includes a vertical movement mechanism for moving said image blur compensating group into a plane generally normal to the optical axis with respect to a dynamic inclination of the whole said optical system.

6. A zoom lens including a variable power lens group, and said variable power lens group serving as an image blur compensating group which is able to displace with respect to the remaining lens groups.

7. A zoom lens comprising three or more lens groups, a variable power lens group serving as an image blur compensating group which is displaceable with respect to the remaining lens groups, a magnification $m_c$ of the image blur compensating group satisfying the relation with respect to a composite focal length $f_1$ of the lens groups nearer to an object than the image blur compensating group, such that $$m_c = 1/[1 + \{f_1(X-B)\}]$$

wherein B is an arbitrary constant, and X is a distance from said image blur compensating group to an image surface.

8. A zoom lens according to claim 7,
wherein said lens groups comprise four lens groups with first, second, third and fourth lens groups arranged in this order from the side of an object to be taken, and said second lens group serves as said image blur compensating group.

9. A zoom lens according to claim 7,
which includes an image position correcting lens group located in a position nearer to said image than said image blur compensating group and adapted to maintain constant the distance from said image blur compensating group to an image surface.

10. A zoom lens according to claim 7,
which includes a rotary movement mechanism for rotating said image blur compensating group about a point on the optical axis with respect to a dynamic inclination of the whole said optical system.

11. A zoom lens according to claim 7,
which includes a vertical movement mechanism for moving said image blur compensating group into a plane generally normal to the optical axis with respect to a dynamic inclination of the whole said optical system.

12. A zoom lens comprising three lens groups as an optical system with first, second and third lens groups arranged in this order from an object to be taken, said third lens group serving as an image blur compensating group which is displaceable with respect to the remaining lens group, the magnification $m_c$ of said third lens group satisfying the relation with respect to a composite focal length $f_1$ of said first and second lens groups, such that $$m_c = 1/\{1 + (f_1/A)\}$$

wherein A is an arbitrary constant.

13. A zoom lens according to claim 12,
which includes a rotational movement mechanism for rotating said image blur compensating group about a point on the optical axis with respect to a dynamic inclination of the whole said optical system.

14. A zoom lens according to claim 12,
which includes a vertical movement mechanism for moving said image blur compensating group into a plane generally normal to the optical axis with respect to a dynamic inclination of the whole said optical system.

15. A zoom lens comprising four lens groups as an optical system with first, second, third and fourth lens groups arranged in this order form an object to be taken, said second lens group serving as an image blur compensating group which is displaceable with respect to the remaining lens groups, a magnification $m_c$ of said second lens group satisfying the relation with respect to a composite length $f_1$ of said first lens group, such that $$m_c = 1/[1 + \{f_1(X-B)\}]$$

wherein B is an arbitrary constant, and X is the distance from the image blur compensating group to an image sensitive surface.

16. A zoom lens according to claim 15,
which includes a rotational movement mechanism for rotating said image blur compensating group about a point on the optical axis with respect to a dynamic inclination of the whole said optical system.

17. A zoom lens according to claim 15,
which includes a vertical movement mechanism for moving said image blur compensating group into a plane generally normal to the optical axis with respect to a dynamic inclination of the whole said optical system.

18. A zoom lens comprising three or more lens groups as an optical system, at least one lens group located in a position nearer to an image than a variable power lens group serving as an image blur compensating group which is able to displace with respect to the remaining lens groups, a magnification $m_c$ of said image blur compensating group satisfying the relation with respect to a composite focal length $f_1$ of the lens groups nearer to an object than said image blur compensating group, such that $$m_c = 1/\{1 + (f_1/A)\}$$

wherein A is an arbitrary constant.

19. A zoom lens according to claim 18, wherein said lens groups comprise three lens groups with first, second and third lens groups arranged in this order from the side of an object to be taken, said third lens group serves as said image blur compensating group, and said second and third lens groups serve as said variable power lens group.

20. A zoom lens according to claim 18, which includes an image position correcting lens group located at a position nearer to said image than said image blur compensating group and adapted to maintain constant the distance from said image blur compensating group to an image surface.

21. A zoom lens according to claim 18, which includes a rotary movement mechanism for rotating said image blur compensating group around a point on the optical axis with respect to a dynamic inclination of the whole said optical system.

22. A zoom lens according to claim 18, which includes a vertical movement mechanism for moving said image blur compensating group into a plane generally normal to the optical axis with respect to a dynamic inclination of the whole said optical system.

23. A zoom lens comprising three or more lens groups as an optical system, at least one lens group located in a position nearer to an image than a variable power lens group serving as an image blur compensating group which is displaceable with respect to the remaining lens groups, a magnification $m_c$ of the image blur compensating group satisfying the relation with respect to a composite focal length $f_1$ of the lens groups nearer to an object than the image blur compensating group, such that $$m_c = 1/[1 + \{f_1(X-B)\}]$$

wherein B is an arbitrary constant, and X is a distance from said image blur compensating group to an image surface.

24. A zoom lens according to claim 23, wherein said lens groups comprise four lens groups with first, second, third and fourth lens groups arranged in this order from the side of an object to be taken, and said second lens group serves as said image blur compensating group.

25. A zoom lens according to claim 23, which includes an image position correcting lens group located in a position nearer to said image than said image blur compensating group and adapted to maintain constant the distance form said image blur compensating group to an image surface.

26. A zoom lens according to claim 23, which includes a rotary movement mechanism for rotating said image blur compensating group about a point on the optical axis with respect to a dynamic inclination of the whole said optical system.

27. A zoom lens according to claim 23, which includes a vertical movement mechanism for moving said image blur compensating group into a plane generally normal to the optical axis with respect to a dynamic inclination of the whole said optical system.

* * * * *

UNITED STATES PATENT AND TRADEMARK OFFICE
CERTIFICATE OF CORRECTION

PATENT NO. : 5,039,211
DATED : August 13, 1991
INVENTOR(S) : Koichi MARUYAMA

It is certified that error appears in the above-indentified patent and that said Letters Patent is hereby corrected as shown below:

At column 14, line 19 (claim 25, line 5), change "form" to ---from---.

Signed and Sealed this

Fourteenth Day of March, 1995

BRUCE LEHMAN

Attest:

Attesting Officer

Commissioner of Patents and Trademarks